April 7, 1925.  1,532,965
A. VALLOT
CAP COVER
Filed June 18, 1923
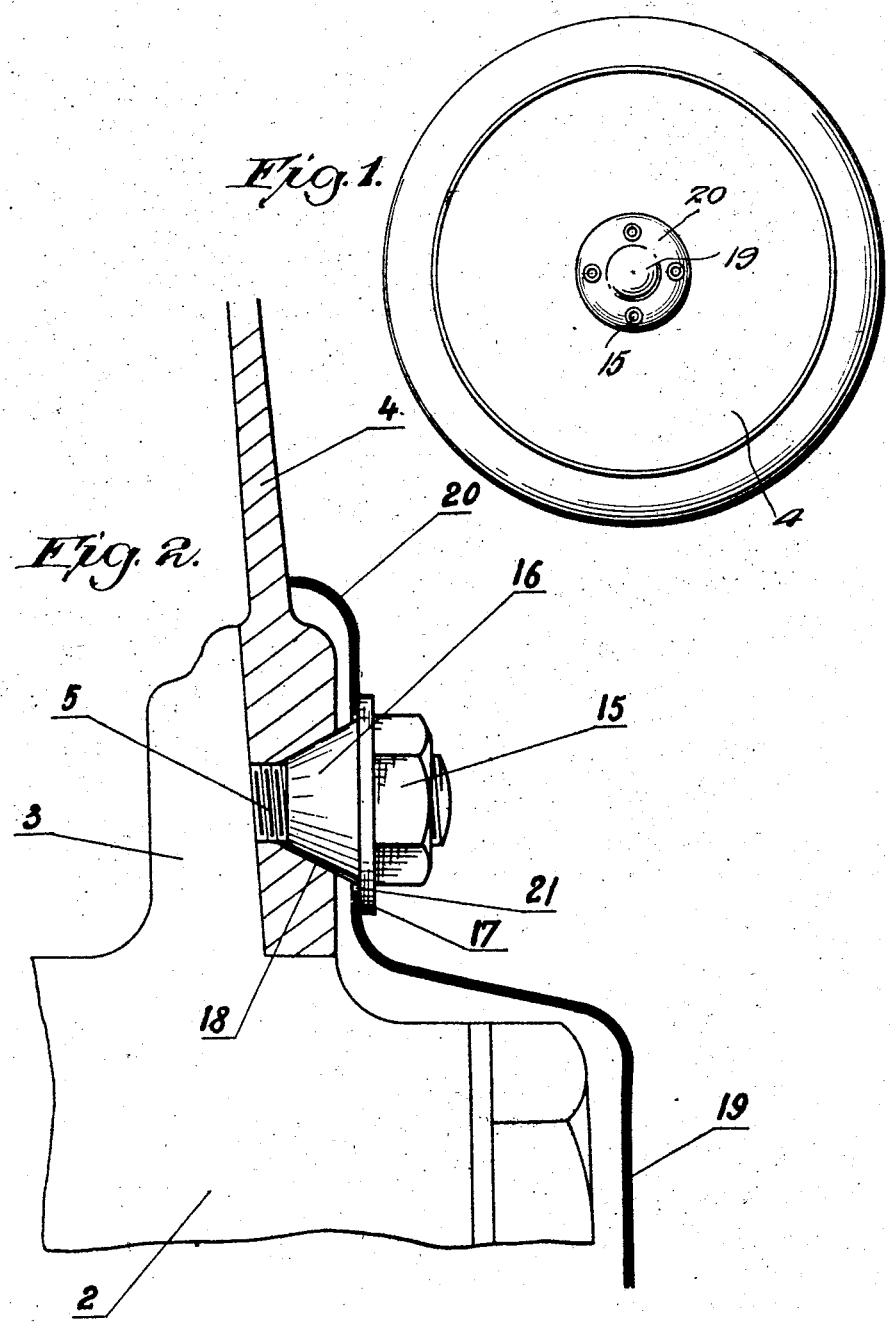
Inventor
A. Vallot
by Langner, Parry, Card & Langner
Attys.

Patented Apr. 7, 1925.

1,532,965

UNITED STATES PATENT OFFICE.

ANDRÉ VALLOT, OF LEVALLOIS, FRANCE.

CAP COVER.

Application filed June 18, 1923. Serial No. 646,261.

*To all whom it may concern:*

Be it known that I, ANDRÉ VALLOT, a citizen of the French Republic, residing at Levallois, Seine, France, 114 Rue de Cormeilles, have invented certain new and useful Improvements in Cap Covers, of which the following is a specification.

My invention relates to a device for securing cap covers to wheels, and particularly to certain removable wheels of the solid or other type of motor vehicle wheels.

The cap-cover consists of a dome-shaped portion and a flange, but the said flange has formed therein various holes whose number corresponds to that of the bolts and nuts serving to secure the wheel, and the cap-cover is attached to the wheel by the same nuts which are used to secure the wheel to the hub. This is carried out by a special nut provided with a flange or shoulder.

The diameter of the holes in the flange of the cap-cover is made larger than the diameter of the tapered part forming the base of the nut, but smaller than the diameter of the special flange of the nut. This flange will therefore press slightly upon the edges of the holes and will thus aid in maintaining the cap-cover.

The following description together with the accompanying drawings which are given by way of example sets forth two embodiments of the present invention.

Fig. 1 is a front view of a solid wheel provided with a cap-cover.

Fig. 2 is a diametrical section.

The hug 2 is provided with the flange 3 having secured thereto the solid wheel 4 by means of a plurality of bolts 5 and nuts 15 (four in the present case), the latter being disposed upon the outer face of the wheel.

Each of the nuts 15 has a tapered base 16, and at the largest part of the latter a flange 17. The base 16 is fitted into a corresponding recess 18 formed in the outer face of the wheel 4.

The cap cover is made of thin metal, for example of pressed brass. It comprises a dome-shaped part 19 containing the cap, and a flanged part 20 having therein the holes 21 corresponding to the wheel bolts 5, the diameter of the said holes is greater than the largest part of the base 16 but is smaller than that of the flange 17. The latter flange which bears upon the edge of the holes is so disposed that when the base 16 fits completely into the recess 18 the flange 17 will press slightly against the flange 20, a certain play being allowed between said flange and the wheel. So that when by reason of the wear the base 16 proceeds still further into the said recess, the flange 20 will still be held in place without coming into contact with the wheel and hence without being pressed between two hard metals.

Obviously, the said central dome-shaped part might be eliminated from the said device, preserving only the annular flange which in this event would allow the wheel cap to pass through the central part of the same.

What I claim is:

A device for securing cap-covers to the wheels of motor vehicles comprising in combination, a hub, a hub-extension, attaching bolts secured thereto, a wheel body having holes cooperating with said bolts and traversed by the latter, conical recesses formed in the main body of the wheel around the said bolts, wheel-attaching nuts screwed to said bolts and provided with a base fitting into the said recesses, flanged parts formed on said nuts whose diameter is larger than that of the largest part of the said base, and a flange forming an extension of the said cap cover and having therein holes corresponding to the said attaching bolts, the diameter of said holes being larger than the largest part of the said base and smaller than the diameter of the flange of the nut, the distance between the base of the nut and its flange being such that when the said base is caused to bear within its recess the flange of the said nut will press slightly upon the flange of the said cap cover, whereof the exterior edge only bears upon the wheel.

In witness whereof I have hereunto set my hand.

ANDRÉ VALLOT.